Oct. 16, 1962
E. CAVALIERI
3,058,413
ROLLER OR TROUGH MACHINE FOR THE FINAL
WORKING UP OF CHOCOLATE
Filed Oct. 28, 1959
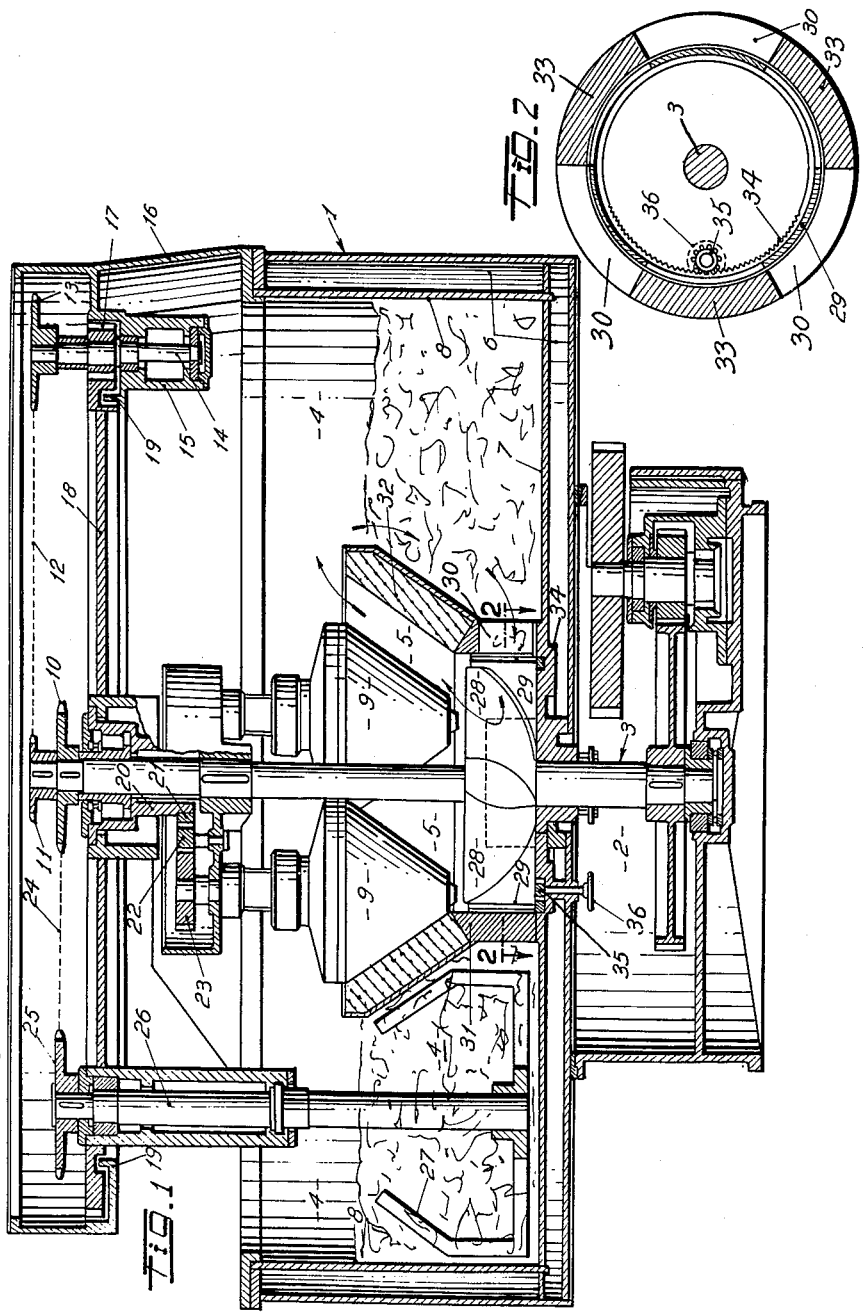
INVENTOR
EMILIO CAVALIERI

United States Patent Office 3,058,413
Patented Oct. 16, 1962

3,058,413
ROLLER OR TROUGH MACHINE FOR THE FINAL WORKING UP OF CHOCOLATE
Emilio Cavalieri, Milan, Italy, assignor to Carle & Montanari, S.p.A., Milan, Italy, a company of Italy
Filed Oct. 28, 1959, Ser. No. 849,224
Claims priority, application Italy Sept. 26, 1959
5 Claims. (Cl. 99—236)

The invention relates to an improved roller or trough machine for the final working up of chocolate.

It is well known to the skilled in the art that after the refining operation, the chocolate mixture must undergo the "working up" operation. This is necessary to render the mixture quite homogeneous above all to develop the aroma, to eliminate humidity and to make it smoother, as it is called, to the palate.

It is also well known that the working up operation can be made easier by adding large quantities of fat such as cocoa butter. But, while on the one hand the presence of a definite fat content assists the working up operation, it also, on the other hand, hinders the elimination of humidity or of the acids which are undesirable in a satisfactory finished product.

Moreover, a high fat content renders the mechanical kneading operation less efficient since the rotating parts in contact with the fat globules which work themselves between the working surface, lose their effectiveness, and thus a much longer time is needed to obtain a product of good quality than if the above drawbacks could be overcome.

Manufacturers have therefore come to prefer the so-called "dry" operation. In this method the product is worked just as it comes from the refining operation, while the fat content, that is, the cocoa butter, is only added after the working up operation of the said product, so as to reach the required percentage. This operation is carried out during the last few hours of the working up operation.

The present machine according to the present invention is intended to overcome these and other drawbacks by permitting the addition of the product obtained from the refining operation directly to the working up machines but without the necessary addition of butter in order to obtain the required fat content.

The machine, according to the present invention, therefore permits a dry working up operation. That is, the product from the refining operation can be poured directly into the trough and the first stage of the operation can be carried out with the product as it stands without the addition of butter, while at the same time remaining beyond the action of the working up rollers. When the mixture, after a time, reaches a certain degree of fluidity even without (as was done in the past) the addition of the butter complement, it goes on to the working up operation proper where the mixture is forced between the working up rollers in the trough.

The advantages inherent in the machine according to the present invention and operating in the manner described below, are several.

In the first place, since the product obtained from the refining operation can be subjected to the working up operation as it stands, that is, as has been pointed out above, with a minimum butter content, it allows the preliminary working up phase to be considerably shortened.

Secondly, the final product is of a higher quality even though the length of the working up operation has been lessened.

It has also been noted that, given an equal fat or butter content for an equal quality of product subjected to the operation of a machine according to the invention and to the operation of a similar machine already on the market, the product at the end of the mixing operation in the machine of this invention has a higher degree of fluidity than the product obtained with other machines already on the market.

Now keeping in mind that the degree of fluidity obtained at the end of the operation with the known machines is already satisfactory for carrying out further operations for the production of chocolate, it is obvious that considerable economies can be attained by reducing the total butter content added to the mixture to be worked by the invented machine.

In other words, it would be possible to save 4–5% of butter while still obtaining a product whose characteristics are the same as those of a product obtained with machines now on the market.

The essential characteristic of the machine according to the present invention which is designed to attain the above purposes, is that it consists substantially of two compartments which can be separated at will by hermetical means of separation controlled independently from the machine, thus permitting the separate and successive carrying out of the first phase of a dry operation on the product as it is obtained from the refining machines. The operation is carried out by means of mixing elements in one of the above compartments whereupon, when the mixture in this first phase has reached a certain degree of fluidity, the mixture is transferred by the mixing elements to the second compartment or trough where the second phase of the operation, that is, the working up proper, is carried out with the addition of the required percentage of fat substances (cocoa butter). This addition is effected only in the last few hours of the operation.

The machine according to the present invention, can take several forms of embodiment, such as for an example, as it will be hereinafter described in detail and illustrated in the accompanying drawing, in which:

FIG. 1 shows a vertical axial section of the machine;

FIG. 2 shows a top view of the partial section along 2—2 of FIG. 1.

Referring to the accompanying drawing illustrating an example of an application, 1 shows the base of the machine on which is fitted the assembly 2 for the control of the central drive shaft 3. According to the invention, there will be two concentric compartments 4 and 5, the first of which is equipped with a heating jacket 6 consisting of a bottom 7 and a lateral wall 8.

As is known the proper working occurs in the inner compartment 5 (trough) by means of identical truncated cone-shaped working up rollers 9—9.

Two sprockets 10, 11 are keyed on the upper parts of the shaft 3. The upper sprocket 11 rotates, by means of the chain 12, the sprocket 13 whose hub 14 rotates on its axis in the fixed seat 15 attached to the fixed casing 16. A pinion 17, keyed to the hub 14, rotates both the cover 18 on its seat 19 and the bushing 20 sliding freely on the shaft 3 which bushing operates the central or sun wheel 21 for the rotation of the planet wheels 22. These latter wheels control the rotation of the rollers 9 by means of the pinions 23.

The sprocket 10, by means of the chain 24, controls the sprocket 25 keyed to the rotating shaft 26 carrying at its lower end the mixing element 27 acting in the external annular compartment 4. The outer contour of the mixing element is very similar to the cross-sectional contour of the compartment 4 so that a very effective mixing action is ensured.

As is well known, the shaft 3 carries fins 28 which act as an impeller pump to assist the passage of the mixture (not shown) from the compartment 4 to the compartment 5 as is envisaged by the invention. The hermetical sealing at will of the two compartments is ensured by the presence of the movable curved sectors 29 and the corresponding windows 30 which are also curved. The windows are in the base 31 of the fixed truncated-cone-shaped wall 32 forming the internal compartment 5. These movable sectors 29 and the windows 30 (of which there are three in the example shown) are at the same angular distance from the corresponding partitions 33 connecting the windows 31.

The sectors 29 are also equally spaced around a circumference and are carried by an internally toothed ring 34 controlled by a pinion 35 itself controlled by an external control wheel 36. The ring 34 is inside the partitions 33 and these, together with the sectors 29, form two circumferences concentric with themselves and with the shaft 3. By turning the control wheel 36, the sectors 29 can be caused to rotate in relation to the partions 33 so that the windows 30 can be opened or closed at will. When these are open, the mixture can pass from the compartment 4 to the compartment 5.

It is obvious that the sectors 29 could be operated differently, for instance, vertically.

According to the invention, the compartment 4 is intended for the first stage of the operation, that is, to make the mixture obtained from the refining machine sufficiently fluid so that it can be passed to the compartment 5 for the proper working up operation by the use of the rollers 9.

At the start of the operation, the two compartments 4 and 5 of the machine are hermetically sealed, that is, the sectors 29 are so adjusted as to close the windows 30, so that the first operation is carried out in the outer annular compartment 4. This first operation is designed to render the mixture fluid to an extent suitable for passing to the working up rollers. The operation in compartment 5 is the second and final stage of the process.

Thus the product of compartment 4 passes into compartment 5 through the abovementioned windows 30, and by the action of the rollers 9, falls into compartment 4 and starts the operating cycle again for the duration of the working up operation.

It should be understood that the present disclosure is for the purpose of illustration only and that this invention includes all modifications and equivalents which fall within the scope of the subject matter claimed.

What is claimed is:

1. A chocolate treating machine comprising an annular mixing compartment having a bottom wall, a circular outer side wall and a circular inner side wall, said inner side wall having an upwardly flaring frustoconical shape, a second bottom wall at the bottom of said inner side wall and defining in cooperation therewith a working-up compartment contiguous to the annular mixing compartment, having a common wall therewith and being separate and distinct therefrom, both said compartments having open top mouths, a mixing element in said mixing compartment, means mounting said mixing element for revolution about a vertical axis passing through said element and for rotation about a vertical axis passing through the center of said working-up compartment, power means for revolving said mixing element about its axis of revolution and for concurrently rotating said mixing element about its axis of rotation whereby the mixing element will sweep through the annular mixing compartment revolving about its axis of revolution as it does so, a working-up roller in said working-up compartment, said roller having an upwardly flaring frustoconical shape the angle of which matches the flare angle of the side wall of the working-up compartment, said roller being symmetrical about a vertical axis passing through it and said roller riding on the inner surface of the frustoconical wall of the working-up compartment, means mounting said working-up roller for revolution about its axis of symmetry and for rotation about the vertical central axis of the working-up compartment, means for revolving said roller about its axis of symmetry and for concurrently rotating said roller about its axis of rotation, said common wall having an opening therein adjacent said bottom walls, a member, means mounting said member for movement between a first position in which it hermetically closes said opening and isolates said compartments from one another and a second position in which it exposes said opening to provide communication between said compartments, means to selectively move said member from either one to the other of said positions, fins located in the bottom of the working-up compartment adjacent said opening and mounted for rotation about a vertical axis, and means to rotate said fins about said axis so as to pump fluid chocolate from the mixing compartment into the working-up compartment when the member is in its second position, said chocolate being further urged upwardly by the action of the roller on the flaring side wall of the mixing compartment whereby fluid chocolate will flow over the mouth of the working-up compartment into the top of the mixing compartment and whereby the fluid flowing over the top of the working-up compartment also will experience a circular movement concentric with the central vertical axis of the working-up compartment.

2. A chocolate treating machine as set forth in claim 1 wherein the member mounting means is arranged for horizontal movement of the member.

3. A chocolate treating machine as set forth in claim 1, wherein the opening comprises plural windows angularly spaced around the circumference of the base, and wherein plural members are provided which are simultaneously movable between first and second positions with respect to said windows.

4. A chocolate treating machine as set forth in claim 3 wherein the windows are curved to the circumference of the base of the bowl, wherein the members are located within the bowl and are curved to match the windows, and wherein the means to move the members comprises an annular gear, a pinion in mesh with the gear, and a selectively operable wheel on the outside of the compartment and operatively connected to the pinion.

5. A chocolate treating machine as set forth in claim 1 wherein the mixing member has a shape which conforms to the cross-section of the mixing compartment.

References Cited in the file of this patent

UNITED STATES PATENTS

| | | |
|---|---|---|
| 2,669,924 | Wiemer | Feb. 23, 1954 |
| 2,692,124 | Mendozo | Oct. 19, 1954 |
| 2,760,447 | Mendozo | Aug. 28, 1956 |
| 2,784,096 | Ciccone | Mar. 5, 1957 |
| 2,831,418 | Ponisch | Apr. 22, 1958 |